(12) United States Patent
Sohn et al.

(10) Patent No.: US 7,792,520 B2
(45) Date of Patent: Sep. 7, 2010

(54) METHOD OF TRANSMITTING MULTIMEDIA MESSAGE IN VARIOUS SERVICE ENVIRONMENTS

(75) Inventors: Sang-Mok Sohn, Seongnam-si (KR); Hong-Seo Yun, Incheon (KR); Dong-Won Na, Seongnam-si (KR); Ja-Young Yoon, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 831 days.

(21) Appl. No.: 10/578,995

(22) PCT Filed: Jul. 1, 2004

(86) PCT No.: PCT/KR2004/001620

§ 371 (c)(1),
(2), (4) Date: Mar. 28, 2007

(87) PCT Pub. No.: WO2005/048615

PCT Pub. Date: May 26, 2005

(65) Prior Publication Data

US 2007/0275688 A1 Nov. 29, 2007

(30) Foreign Application Priority Data

Nov. 14, 2003 (KR) ...................... 10-2003-0080493

(51) Int. Cl.
*H04M 3/00* (2006.01)

(52) U.S. Cl. .................. 455/418; 455/70; 455/419; 455/420; 455/466; 709/203; 709/214; 709/215; 709/216; 709/217; 709/218; 709/219; 709/226; 709/227; 709/228; 709/229

(58) Field of Classification Search .................. 455/70, 455/418–420, 466; 709/203, 214–219, 226–229
See application file for complete search history.

(56) References Cited

U.S. PATENT DOCUMENTS 7,277,951 B2 * 10/2007 Marriott et al. ............. 709/228

(Continued)

FOREIGN PATENT DOCUMENTS

KR 2000-0000422 1/2000

(Continued)

OTHER PUBLICATIONS

PCT Int'l. Search Report dated Oct. 18, 2004.

*Primary Examiner*—Nick Corsaro
*Assistant Examiner*—Amanuel Lebassi
(74) *Attorney, Agent, or Firm*—Lowe Hauptman Ham & Berner LLP

(57) ABSTRACT

Disclosed herein is a method of transmitting a multimedia message in a mobile communication system, which allows a receiving terminal to access an MMS server suitable for its specification and receive a stored multimedia message, even when a single MMS server is not equipped with all types of media conversion functions corresponding to all specifications of the receiving terminals. According to the invention, the MMS server stores a multimedia message transmitted from a transmitting terminal in a common message storage unit, and ascertains the specification of a receiving terminal while informing the receiving terminal of the arrival of the message. The MMS server includes in a notice message the address of an MMS server that services media data reproducible by the receiving terminal and informs the receiving terminal of the arrival of the multimedia message.

6 Claims, 3 Drawing Sheets

U.S. PATENT DOCUMENTS 7,289,792 B1 * 10/2007 Turunen .................. 455/414.1
7,349,700 B1 * 3/2008 Goldfinger .................. 455/445
2002/0143975 A1 * 10/2002 Kimura et al. .............. 709/231

FOREIGN PATENT DOCUMENTS

KR    2002-0044306    6/2002
WO    WO99/61966    12/1999

* cited by examiner

[Fig. 1]
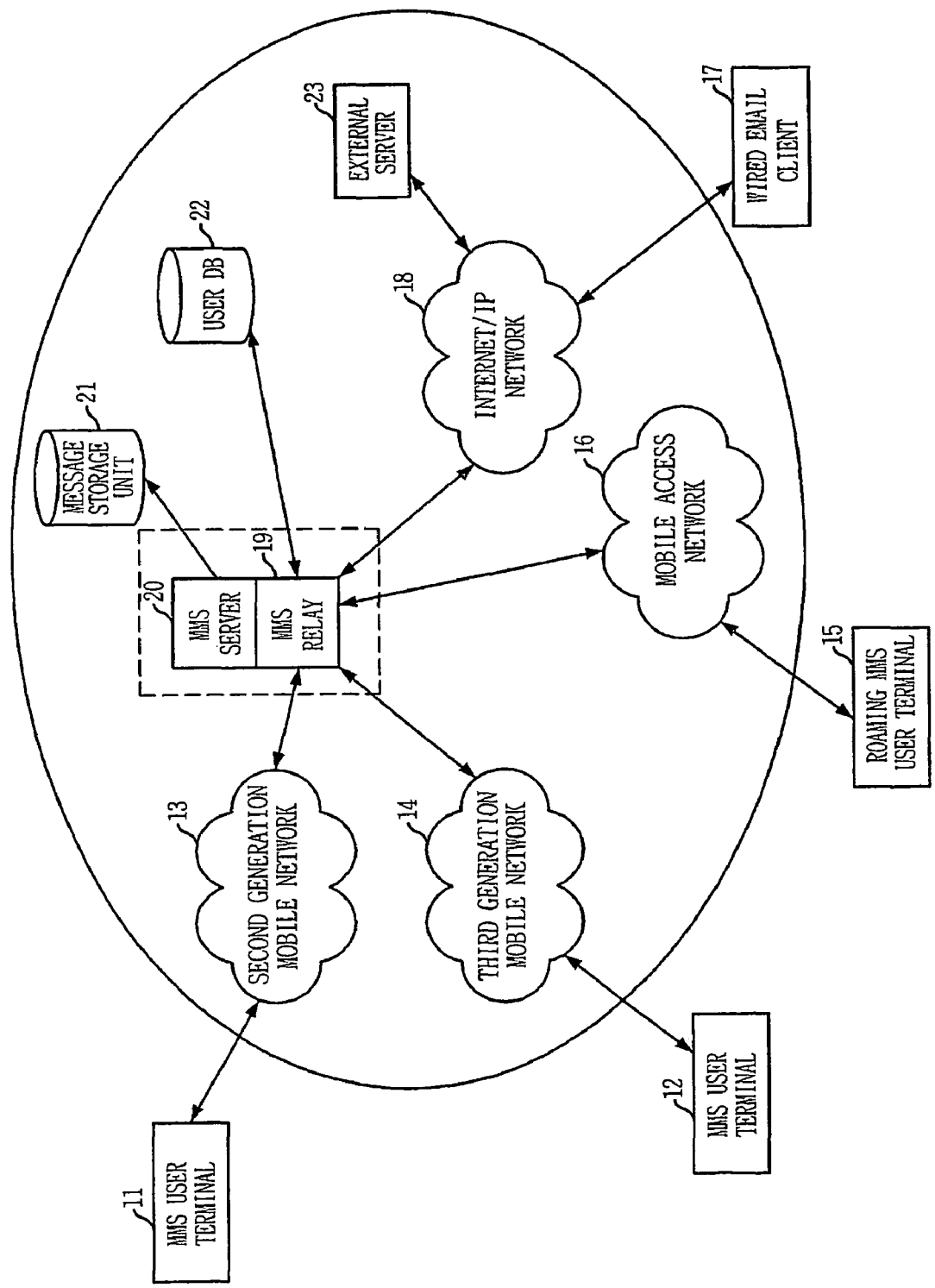

[Fig. 2]
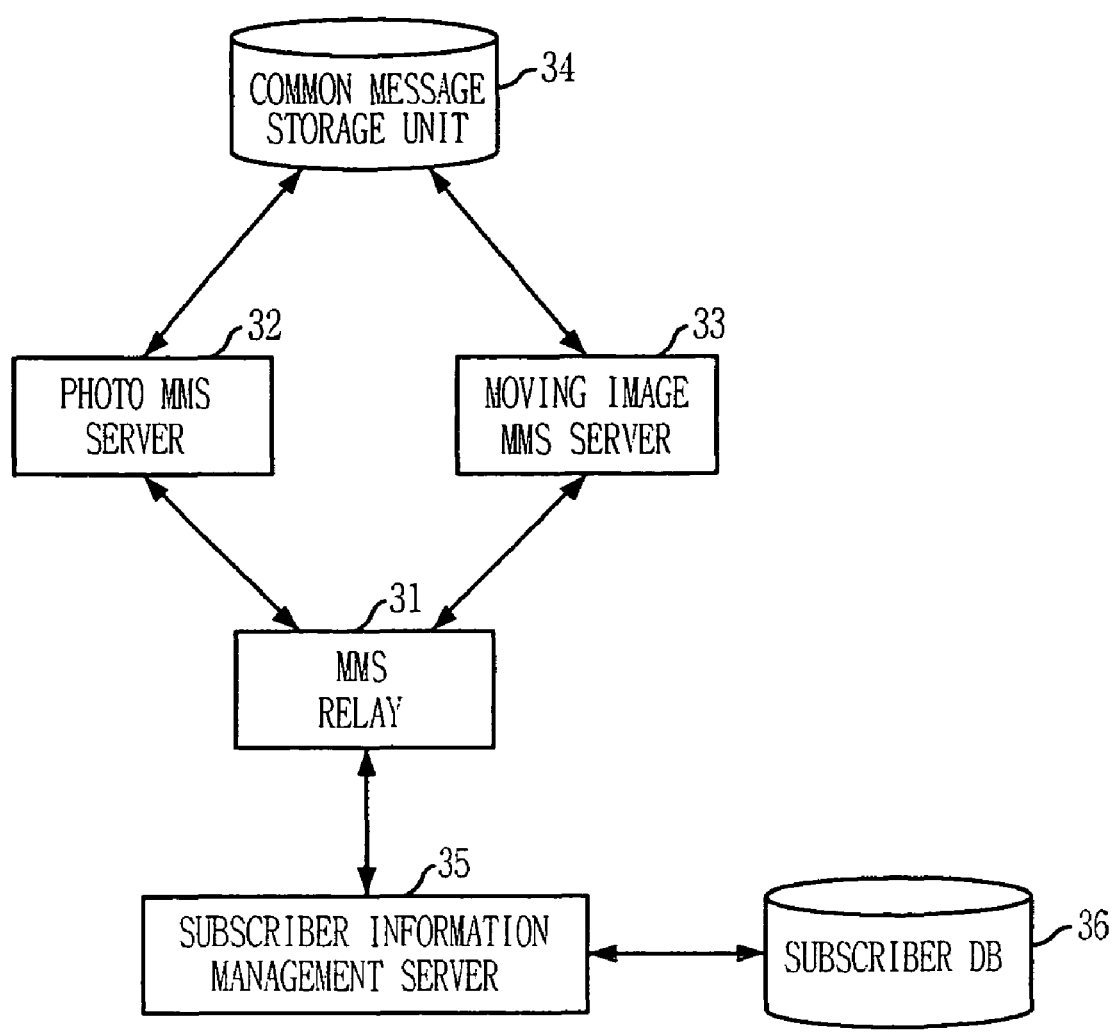

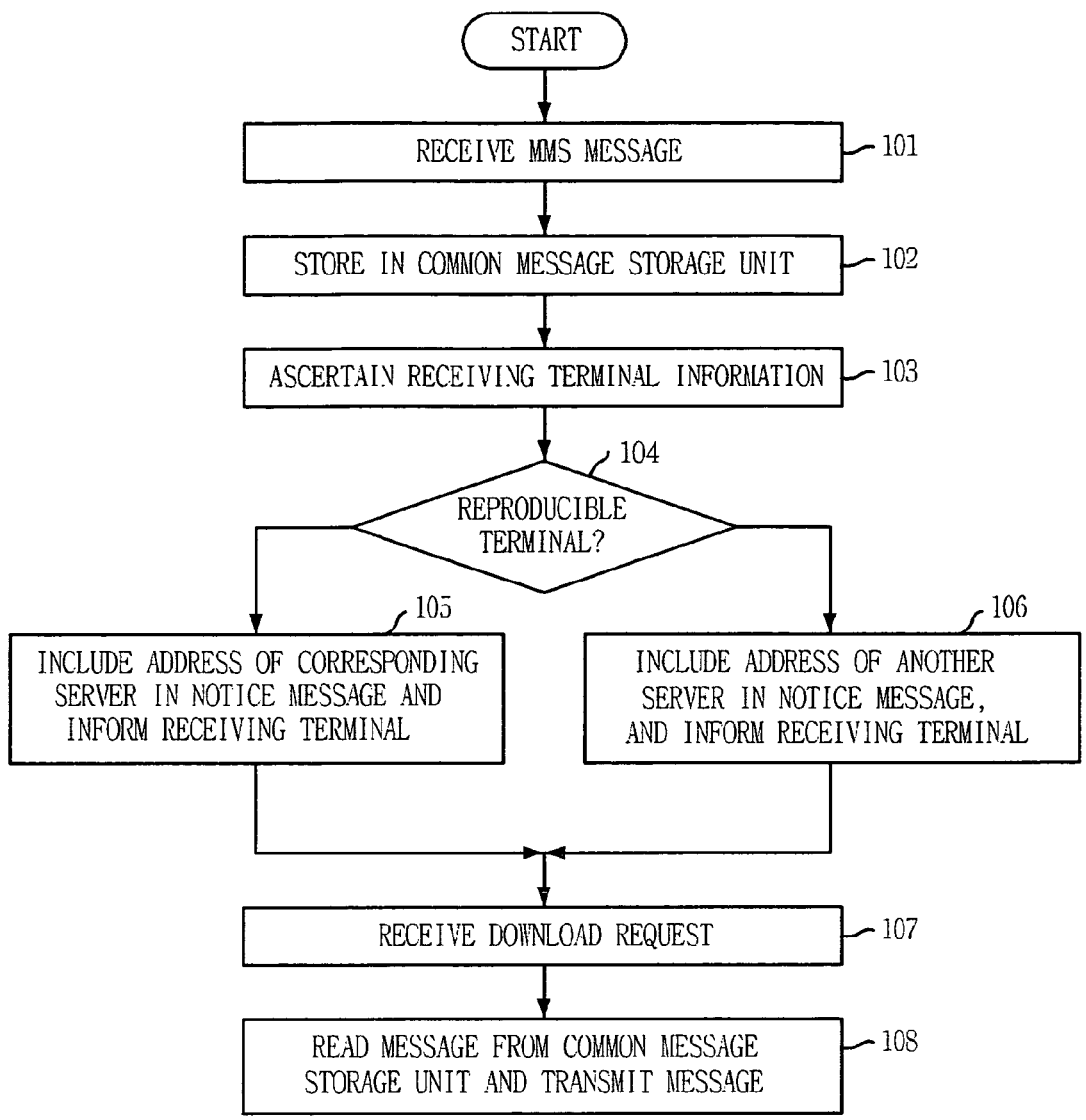
[Fig. 3]

METHOD OF TRANSMITTING MULTIMEDIA MESSAGE IN VARIOUS SERVICE ENVIRONMENTS

CROSS-REFERENCE TO RELATED APPLICATIONS

This application is the U.S. national stage application of International Application PCT/KR2004/001620 filed Jul. 1, 2004, which international application was published on May 26, 2005, as International Publication WO 2005/048615 in the English language. The International Application claims priority of Korean Patent Application 10-2003-0080493, filed Nov. 14, 2003.

BACKGROUND OF THE INVENTION

1. Field of the Invention

The present invention relates to a method of transmitting a multimedia messaging service message in a mobile communication system and, more particularly, to a method of transmitting a multimedia message, which includes the address of a multimedia messaging service server suitable for the type of a receiving terminal in a notice message and transmits the notice message to the receiving terminal, thus efficiently transmitting a multimedia message in various multimedia service environments.

2. Description of the Related Art

Multimedia Messaging Service (MMS) is a service defined by international standards, such as the 3GPP (3rd Generation Partnership Project) Technical Specification (TS) 22.140 and 23.140. MMS allows transmission and reception of various types of multimedia messages, such as voice, image, audio and video data, as well as short messages between mobile terminals.

MMS proposed in the standards adopts store-and-forward messaging as a message transmission method. A multimedia message is transmitted with media contents, information required to describe the media contents, and address information required to identify a message recipient, which are encapsulated in the multimedia message. Such a multimedia message is transmitted to a Multimedia Messaging Service Center (MMSC) from a transmitting mobile terminal. The MMSC informs a receiving mobile of the receipt of the message. Thereafter, the multimedia message stored in the MMSC is transmitted to the receiving terminal in response to the request from a receiving user.

FIG. 1 is a view showing the construction of a typical network for transmitting a multimedia message.

A second generation user terminal 11 is connected to an MMS relay 19 through a second generation mobile network 13. A third generation user terminal 12 is connected to the MMS relay 19 through a third generation mobile network 14. Further, a roaming MMS user terminal 15 is connected to the MMS relay 19 through a mobile access network 16 and an Internet/Internet Protocol (IP) network 18. Further, an external server 23 and a wired email client 17 may be connected to the MMS relay 19 through the Internet/IP network 18. The MMS relay 19 is connected to both an MMS server 20 and a user database (DB) 22. The MMS server 20 is connected to a message storage unit 21 for storing therein a received multimedia message.

In such a network, a user creates a multimedia message to transmit the multimedia message to a specific receiving terminal. As described above, a multimedia message includes characters, moving or still images, voice and audio data. If the multimedia message is transmitted to the MMS server 20, the MMS server 20 stores the received multimedia message in the message storage unit 21, and then transmits to the receiving terminal a message indicating that the received multimedia message exists. Then, the receiving terminal accesses the MMS server using a message number and the address information of a server, which are included in the notice message. Thereafter, the MMS server reads out the multimedia message stored for a designated receiving terminal, and downloads the multimedia message to the receiving terminal. After the downloading of the multimedia message is completed, the receiving terminal releases the connection to the MMS server.

Multimedia messaging service is currently under development, and various MMS servers corresponding to the types of provided multimedia exist. For example, multimedia messaging service which only allows the transmission of still image such as a photograph was used in the early stage of the service. Recently even Synchronized Multimedia Integration Language (SML) MMS has developed. Beyond transmission of moving images, the SML MMS allows the transmission of text, audio and video data and enables the designation of various display functions as well. Further, according to the versions of mobile terminals, certain types of terminals are capable of reproducing only still images or moving images, and some others are capable of reproducing SML MMS messages.

However, there is a problem in that, if a multimedia message is created in a terminal capable of reproducing SML MMS messages and then transmitted to a terminal capable of reproducing only still images, the terminal capable of reproducing only still images cannot reproduce the SML MMS message. In order to solve the problem, respective MMS servers have media conversion functions. Each of the media conversion functions ascertains the specification of a receiving terminal and transmits multimedia message, which includes only the media data reproducible by the receiving terminal, to the receiving terminal. Therefore, respective MMS servers should be equipped with media conversion functions corresponding to the respective types of multimedia data so as to accommodate all the terminals having various specifications. This problem caused increase of the service charges.

SUMMARY OF THE INVENTION

Accordingly, the present invention has been made to solve the above problems of the prior art, and an object of the present invention is to provide a method of transmitting a multimedia message in a mobile communication system, which allows receiving terminals having various specifications to access an MMS server suitable for the specification thereof and receive a stored multimedia message, even when a single MMS server is not equipped with all types of media conversion functions.

In order to accomplish the above object, the present invention provides a method of transmitting a multimedia message in a system having at least two Multimedia Messaging Service (MMS) servers respectively having different versions according to media types of multimedia messages they service. According to the invention, when a first MMS server receives multimedia message from a transmitting terminal, the received multimedia message is stored in a common message storage unit; the first MMS server ascertains specification of a receiving terminal using information of the receiving terminal included in a header of the multimedia message; the first MMS server includes in a notice message both an address of a second MMS server and message information stored in the common message storage unit message, and informs the receiving terminal of arrival of the new multimedia message, when the receiving terminal is ascertained as a terminal capable of reproducing a multimedia message provided from the second MMS server; the first MMS server includes in a notice message both an address of the first MMS server and message information stored in the common message storage unit and informs the receiving terminal of arrival of the new multimedia message, when the receiving terminal is ascertained as a terminal capable of reproducing a multimedia message provided from the one of the first and second MMS servers; and one of the MMS servers processes the multimedia message stored in the common message storage unit in response to a request from the receiving terminal and transmits processed results to the receiving terminal.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a block diagram of a multimedia message transmitting network to which the present invention is applied;

FIG. 2 is a schematic diagram showing a process of transmitting a multimedia message according to the present invention; and FIG. 3 is a flowchart of a process of transmitting a multimedia message according to the present invention.

DESCRIPTION OF THE PREFERRED EMBODIMENTS

Hereinafter, embodiments of the present invention will be described in detail with reference to the attached drawings.

In the present specification, detailed descriptions on the construction and the operation of the transmission system which are not relevant to the gist of the present invention are omitted. Further, the detailed description of the present invention described below is only an embodiment of the present invention, and those skilled in the art will appreciate that various modifications, additions and substitutions are possible from the technical spirit of the present invention.

FIG. 2 is a schematic diagram showing a system for providing a multimedia messaging service according to the present invention.

As described above with reference to FIG. 1, respective mobile terminals may be connected to MMS servers through an MMS relay 31. The MMS servers may be classified into a photo MMS server 32 capable of processing multimedia messages including photographs, a moving image MMS server 33 capable of processing multimedia messages including moving images, and a SML MMS server (not shown) capable of processing SML MMS messages further upgraded compared to the moving image MMS server, according to the types of media data supported thereby. Further, the system includes a common message storage unit for storing therein all transmitted multimedia messages regardless of the media type. The storage unit is preferably implemented with a large-capacity database.

Each of the MMS servers separates each of multimedia messages transmitted from a transmitting terminal according to their media types, and stores the separated media data in the common message storage unit 34. For example, a photo MMS message includes text entered by a user, and a still image (photograph). The photo MMS server separates the multimedia message into the text and the still image, and stores the separated media data in a single folder of the common message storage unit 34. In the meantime, a SML MMS message may include a text, three photographs (one jpeg format photograph and two Simple Image Solution (SIS) format-photographs), and one moving image. Accordingly, the SML MMS server separates the SML MMS message into the text, the still images and the moving image, and stores the separated media data in the common message storage unit 34 as exemplified below.

/MMS_MM_ALL/011/9/200/0/432/sent/2_w07654321_000.smi

/MMS_MM_ALL/011/9/200/0/432/sent/2_w07654321_000.txt

/MMS_MM_ALL/011/9/200/0/432/sent/2_w07654321_000.jpg

In this state, each MMS server only downloads the stored media data which suitable for a multimedia message type that it can service. Then the MMS server converts the downloaded media data, and transmits the converted media data to a receiving terminal.

The SML MMS message is created using a template, which includes text, image, background music and voice menu items and an image production menu item. A user enters desired data using the respective menu items provided from the template. Further, the image production menu item provides a preview function. Further, the template provides a function of controlling the display formats of an input text. The display formats may include a typing format, a flying-from-left format, a flying-from-below-to-above format, a wiping format, and a blinding format.

The MMS relay 31 is connected to a subscriber information management server 35 for managing the terminal information of respective subscribers. The subscriber information management server 35 includes a subscriber database (DB) 36. In the subscriber database 36, the specification information of the terminals of respective subscribers, as well as the personal information of the respective subscribers, is stored.

FIG. 3 is a flowchart of a method of transmitting a multimedia message in MMS servers according to the present invention.

A transmitting terminal creates a multimedia message intended to transmit and transmits the multimedia message to a corresponding MMS server. At this time, if the transmitting terminal is capable of reproducing a multimedia message including a still image, the transmitting terminal is connected to the photo MMS server 32. If the transmitting terminal is capable of reproducing a multimedia message including a moving image, the transmitting terminal is connected to the moving image MMS server 33.

The transmitted multimedia message includes the information of a receiving terminal, for example, the Mobile Identification Number (MIN) information of the receiving terminal. If the photo MMS server 32 or moving image MMS server 33 receives a multimedia message from the transmitting terminal at step 101, the corresponding MMS server separates the received multimedia message according to media types, and stores the separated media data in the same folder of the common message storage unit 34 at step 102. Further, the corresponding MMS server inquires the subscriber information management server 35 of the specification of the receiving terminal using the MIN information of the receiving terminal included in the multimedia message.

Thereafter, the corresponding MMS server receives the specification information of the receiving terminal from the subscriber information management server 35 and ascertains the specification information of the receiving terminal at step 103. As a result of the ascertainment, if the receiving terminal is a terminal capable of directly reproducing the multimedia message created by and transmitted from the transmitting terminal, that is, if the receiving terminal and the transmitting terminal have the same specification (step 104), the corresponding MMS server includes the address thereof in a notice message, and informs the receiving terminal of the receipt of the multimedia message through the use of a push access protocol server at step 105. However, if the receiving terminal is a terminal incapable of directly reproducing the multimedia message created by and transmitted from the transmitting terminal, that is, if the receiving and transmitting terminals have different specifications, the corresponding MMS server includes the address of an alternative MMS server capable of being accessed by the receiving terminal in a notice message, and informs the receiving terminal of the receipt of the multimedia message at step 106.

An example of the above process is described in detail below. In the case where a transmitting terminal capable of processing a SML MMS message transmits a SML MMS message to a receiving terminal, the transmitting terminal transmits the message while accessing the SML MMS server. The SML MMS server separates the SML MMS message transmitted from the transmitting terminal according to the media types, and stores the separated media data in the common message storage unit. Thereafter, the SML MMS server inquires about the specification of the receiving terminal using the information of the receiving terminal included in the SML MMS message.

When receiving inquired results, the SML MMS server can ascertain whether the receiving terminal can reproduce the SML MMS message. If the receiving terminal is a photo MMS terminal capable of reproducing only a multimedia message including a still image, the SML MMS server includes both the address of a photo MMS server and the file information stored in the common message storage unit in a notice message instead of the address of the SML MMS server, and informs the receiving terminal of the receipt of the SML MMS message. If the receiving terminal is a terminal capable of processing the SML MMS message, the SML MMS server includes both the address thereof and the file information stored in the common message storage unit in a notice message, and informs the receiving terminal of the receipt of the SML MMS message.

Thereafter, the receiving terminal accesses the corresponding MMS server depending on the notice message received from the MMS server, and downloads the multimedia message stored in the common message storage unit. In this case, the multimedia message stored in the common message storage unit cannot be reproduced by the receiving terminal itself. However, the MMS server connected to the receiving terminal is aware of message format reproducible by the receiving terminal. That is, the MMS server is provided with a message conversion function suitable for the type of media that the MMS server services. Therefore, the MMS server converts the message stored in the common message storage unit using a message conversion function originally provided in the MMS server and transmits the converted results to the receiving terminal at steps 107 and 108.

As described above, the multimedia transmission method according to the present invention provides a receiving terminal with a notice message which informs a receiving terminal of the receipt of a new MMS message, and the notice message includes the address of a MMS server that services a multimedia message corresponding to the specification of each receiving terminal. Thus the receiving terminal may access an MMS server suitable for the specification thereof to receive and reproduce all the multimedia messages transmitted from any transmitting terminals regardless of the specifications of the receiving terminal. Further, the present invention is advantageous in that each of MMS servers need not to be equipped with all types of multimedia message conversion functions according to all types of terminal specifications. That is, the present invention allows a photo MMS terminal to directly access a photo MMS server and to receive a multimedia message using a function provided in the photo MMS server, even though a SML MMS server is not provided with a photo MMS processing function for the photo MMS terminal.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of transmitting a multimedia message in a system having at least two Multimedia Messaging Service (MMS) servers having different versions according to the media types of multimedia messages they service, comprising the steps of:

storing a received multimedia message in a common message storage unit when a first MMS server receives the multimedia message from a transmitting terminal;

ascertaining specification of a receiving terminal using information of the receiving terminal included in a header of the multimedia message by the first MMS server;

including in a notice message to the receiving terminal both an address of a second MMS server and message information stored in the common message storage unit, and informing the receiving terminal of arrival of the new multimedia message when the receiving terminal is ascertained as a terminal incapable of reproducing the multimedia message provided from the first MMS server and the receiving terminal is ascertained as a terminal capable of reproducing the multimedia message provided from the second MMS server;

including in a notice message to the receiving terminal both an address of the first MMS server and message information stored in the common message storage unit and informing the receiving terminal of arrival of the new multimedia message, when the receiving terminal is ascertained as a terminal capable of reproducing the multimedia message provided from the first MMS server; and processing the multimedia message stored in the common message storage unit in response to a request from the receiving terminal and transmitting processed results to the receiving terminal.

2. The multimedia message transmitting method according to claim 1, wherein each of the first and second MMS servers separates the multimedia message transmitted from the transmitting terminal according to types of media data included in the multimedia message and stores the separated media data in a same folder when storing the multimedia message in the common message storage unit.

3. The multimedia message transmitting method according to claim 2, wherein the processing of the multimedia message is performed so that the first or second MMS server selectively reads out the media data of the multimedia message stored in the common message storage unit, converts the media data into multimedia message data format reproducible by the receiving terminal, and transmits the converted multimedia message data.

4. The multimedia message transmitting method according to claim 1, wherein one of the first and second MMS servers includes a server providing a SML multimedia messaging service for transmitting a SML multimedia message, the SML multimedia message being created using a template, the template including text, image, background music and voice menu items and an image production menu item.

5. The multimedia message transmitting method according to claim 4, wherein the template provides a function of previewing a produced image when the image is produced using the image production menu item.

6. The multimedia message transmitting method according to claim 4, wherein the template includes a function of controlling display format of the input text.

* * * * *